US012624736B2

(12) United States Patent
Chen

(10) Patent No.: US 12,624,736 B2
(45) Date of Patent: May 12, 2026

(54) BRAKE DISC

(71) Applicant: I-Ju Chen, Changhua County (TW)

(72) Inventor: I-Ju Chen, Changhua County (TW)

( * ) Notice: Subject to any disclaimer, the term of this patent is extended or adjusted under 35 U.S.C. 154(b) by 401 days.

(21) Appl. No.: 18/522,659

(22) Filed: Nov. 29, 2023

(65) Prior Publication Data

US 2025/0052291 A1     Feb. 13, 2025

(30) Foreign Application Priority Data

Aug. 10, 2023   (TW) ................................. 112130088

(51) Int. Cl.
F16D 65/12          (2006.01)
F16D 65/02          (2006.01)

(52) U.S. Cl.
CPC ...... F16D 65/12 (2013.01); F16D 2065/1304 (2013.01); F16D 2065/134 (2013.01)

(58) Field of Classification Search
CPC .................. F16D 65/12; F16D 65/123; F16D 2065/1304; F16D 2065/1316; F16D 2065/134; F16D 2065/1392
See application file for complete search history.

(56) References Cited

U.S. PATENT DOCUMENTS 6,110,303 A *   8/2000  Takahashi ............... C22F 1/183
                                                             148/407
6,349,800 B1 *  2/2002  Nakamura .............. F16D 55/40
                                                             188/26

| | | | | |
|---|---|---|---|---|
| 7,708,510 | B2 * | 5/2010 | Reimler ................ | F16B 41/002 |
| | | | | 24/457 |
| 8,210,328 | B2 * | 7/2012 | Kano ...................... | F16D 65/12 |
| | | | | 188/218 XL |
| 8,267,228 | B2 * | 9/2012 | Hoshi ..................... | F16D 65/12 |
| | | | | 188/218 XL |
| 8,353,391 | B2 * | 1/2013 | Fujita ..................... | F16D 65/12 |
| | | | | 188/218 XL |
| 9,057,413 | B2 * | 6/2015 | Yamanaka ............ | F16D 65/123 |
| 9,897,155 | B2 * | 2/2018 | Shinagawa ............. | F16D 65/12 |
| 2005/0032596 | A1 * | 2/2005 | Nonoshita ............. | B62K 19/16 |
| | | | | 474/178 |
| 2009/0116930 | A1 * | 5/2009 | Reimler ................. | F16B 37/14 |
| | | | | 411/337 |
| 2010/0282551 | A1 * | 11/2010 | Ruopp .................. | F16D 65/123 |
| | | | | 188/218 XL |
| 2012/0097491 | A1 * | 4/2012 | Yamanaka .............. | F16D 65/12 |
| | | | | 188/218 XL |

(Continued)

*Primary Examiner* — Thomas W Irvin
(74) *Attorney, Agent, or Firm* — MUNCY, GEISSLER, OLDS & LOWE, P.C.

(57)          ABSTRACT

A brake disc is provided, wherein the brake disc includes: a main body including an inner disc and an outer disc disposed around the inner disc; connection mechanisms arranged on the main body each including a projection and an assembling portion which are assemblable with each other and respectively disposed on the inner and outer discs, the assembling portion including an assembling hole and a polygonal counterbore, the projection being inserted in the assembling hole; and blocking assemblies arranged on the main body each including first and second blocking units, the first and second blocking units blocking the projection in the axial direction, the first blocking unit being partially received in the polygonal counterbore.

10 Claims, 5 Drawing Sheets

(56) References Cited

U.S. PATENT DOCUMENTS

| | | | |
|---|---|---|---|
| 2014/0097051 A1* | 4/2014 | Moore | F16D 65/123 |
| | | | 188/218 XL |
| 2015/0047932 A1* | 2/2015 | Shinagawa | F16D 65/12 |
| | | | 188/218 XL |
| 2015/0060218 A1* | 3/2015 | Liu | F16D 65/12 |
| | | | 188/218 XL |

* cited by examiner $1\begin{cases}12 \\ 11\end{cases}$

BRAKE DISC

BACKGROUND OF THE INVENTION

Field of the Invention

The present invention relates to a brake disc.

Description of the Prior Art

Braking systems generally include disc brake systems and drum brake systems. Drum brakes are an earlier braking system. A drum brake includes a brake drum and at least one brake pad, the brake drum is rotatable with a wheel, and is frictionally engaged with the brake pad to achieve braking. A disc brake includes a caliper and a brake disc. The brake disc is rotatable with a wheel, and braking is achieved by the calipers clamping the brake disc. The disc brake has advantages of, for example, quick response, better heat dissipation, less failure of braking, easy disassembly and assembly, etc. Therefore, most vehicles use disc brakes in the braking systems.

Brake discs can be classified into fixed discs and floating discs based on structural characteristics. The floating disc includes an outer disc and an inner disc. The outer disc and the inner disc are connected through a buckle to allow the inner outer disc to slightly shift relative to each other, which ensures that the caliper can reliably frictionally engage with the outer disc. However, the buckle used to connect the inner disc and the outer disc increases the thickness and weight of the brake disc.

The present invention is, therefore, arisen to obviate or at least mitigate the above-mentioned disadvantages.

SUMMARY OF THE INVENTION

The main object of the present invention is to provide a brake disc which is of a small thickness and lightweight.

To achieve the above and other objects, a brake disc is provided, wherein the brake disc includes: a main body defining an axial direction, a radial direction and a circumferential direction, the main body including an inner disc and an outer disc, the outer disc being disposed around the inner disc; a plurality of connection mechanisms arranged on the main body in intervals in the circumferential direction, each of the plurality of connection mechanisms including a projection and an assembling portion which are assemblable with each other, one of the projection and the assembling portion being disposed on the inner disc, the other of the projection and the assembling portion being disposed on the outer disc, the assembling portion including an assembling hole and a polygonal counterbore, the projection and the assembling hole extending in the radial direction, the projection being inserted in the assembling hole, the polygonal counterbore being recessed in the axial direction and in communication with the assembling hole; and a plurality of blocking assemblies arranged on the main body in intervals in the circumferential direction, each of the plurality of blocking assemblies including a first blocking unit and a second blocking unit, the first blocking unit and the second blocking unit being positioned to opposing sides of the main body, the first blocking unit and the second blocking unit blocking the projection in the axial direction so that the projection cannot disengaged from the assembling portion in the axial direction, the first blocking unit being partially received in the polygonal counterbore.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
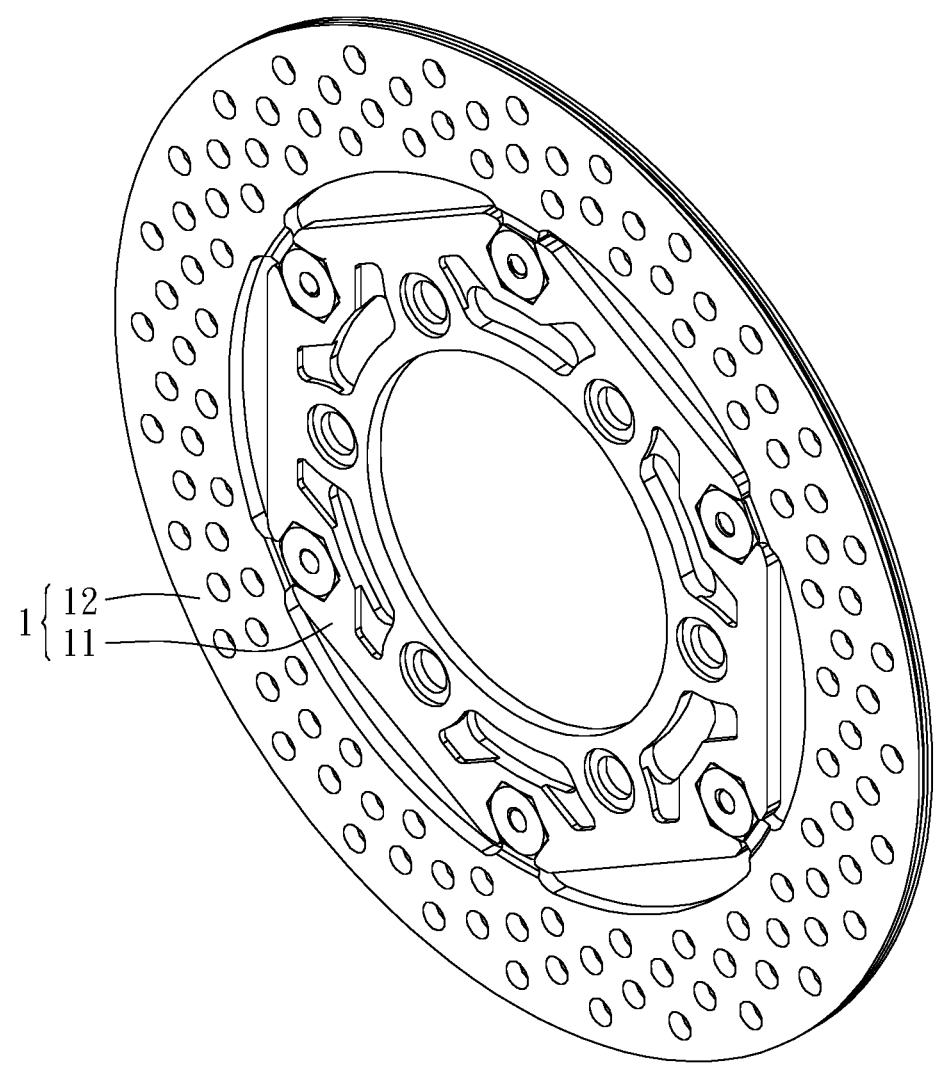
FIG. 1 is a stereogram of an exemplary embodiment of the present invention.
Figure 2:
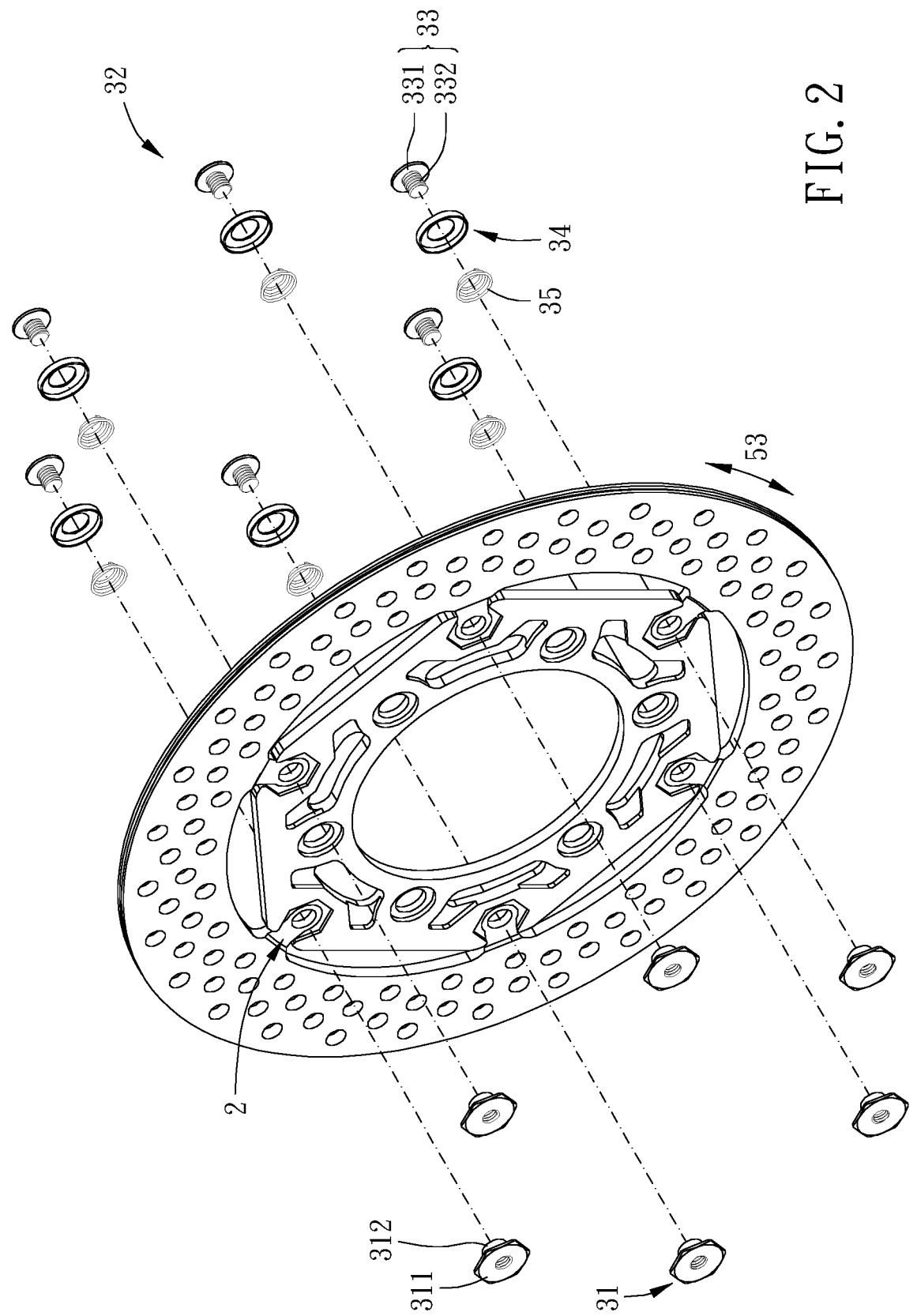
FIG. 2 is a breakdown drawing of an exemplary embodiment of the present invention.
Figure 3:
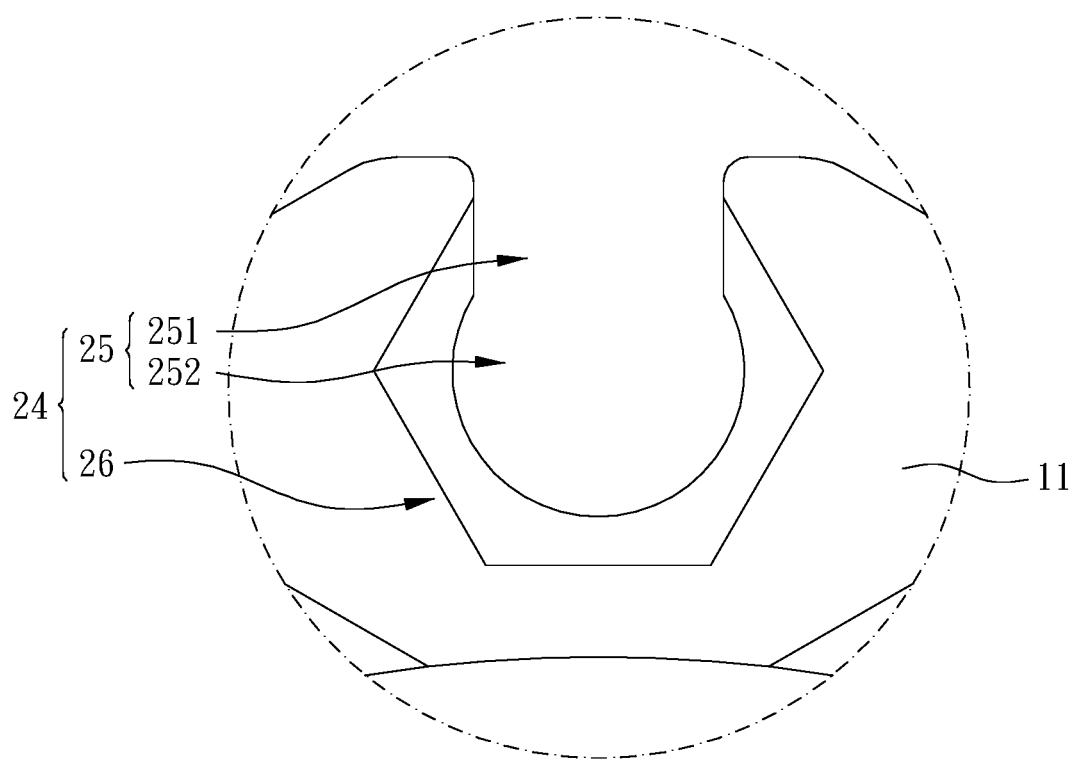
FIG. 3 is a partial enlarged view of an exemplary embodiment of the present invention.
Figure 4:
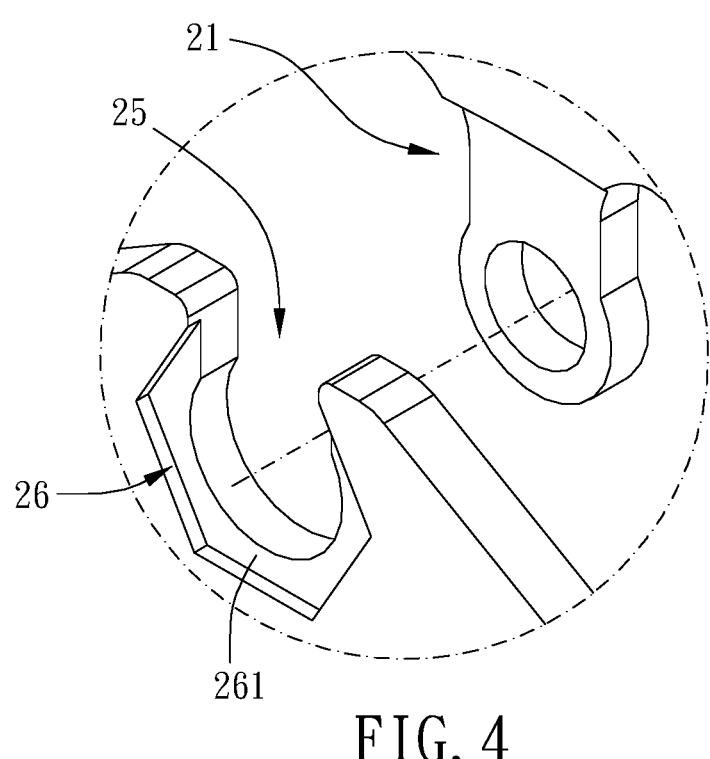
FIGS. 4 and 5 are drawings showing assembling of a projection and an assembling hole according to an exemplary embodiment of the present invention.
Figure 5:
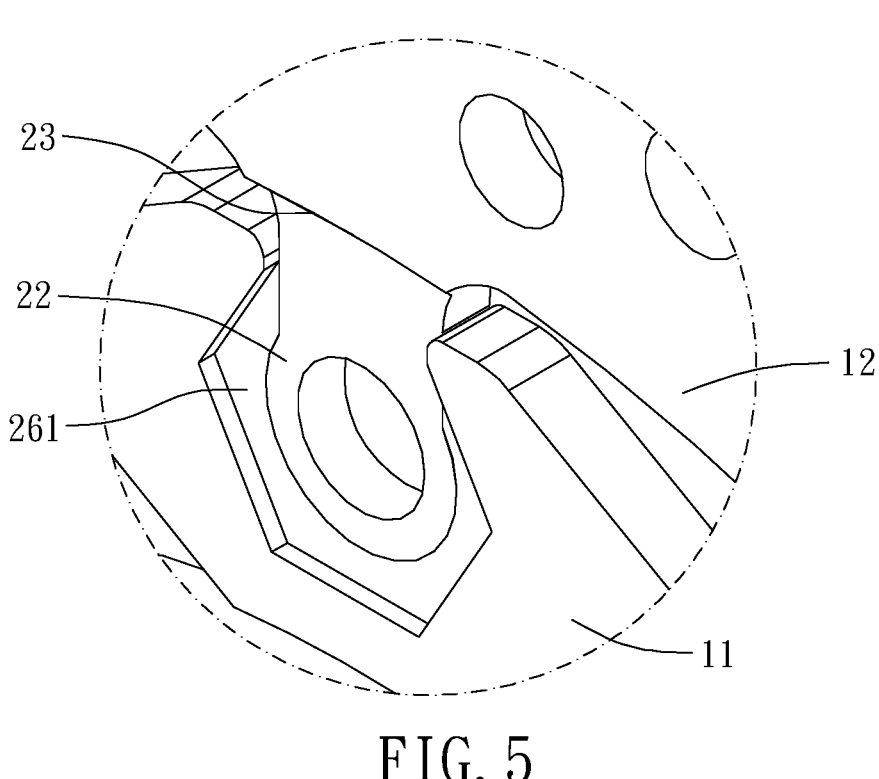
Figure 6:
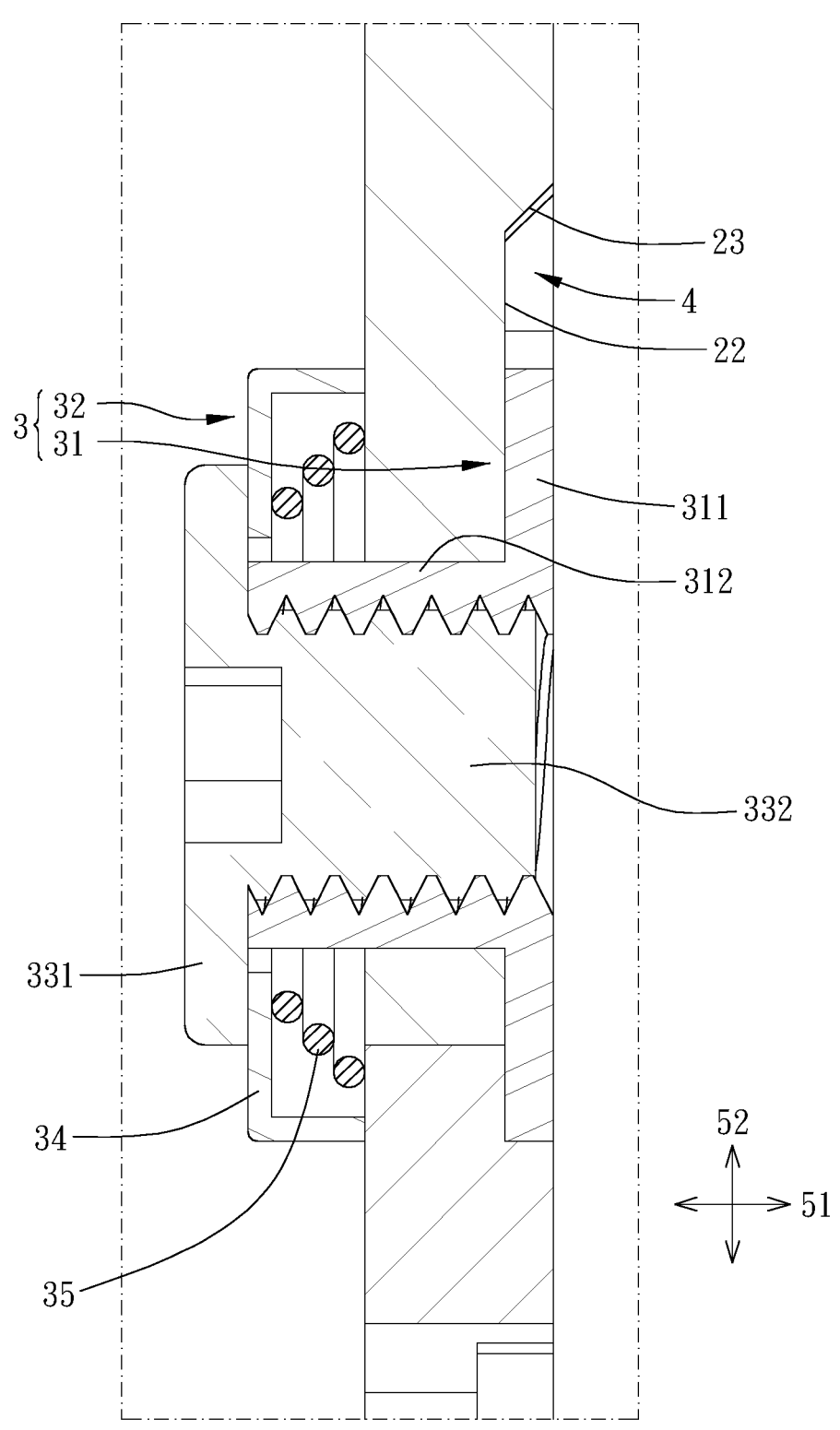
FIG. 6 is a partial enlarged cross-sectional view of an exemplary embodiment of the present invention.

Please refer to FIGS. 1 to 6 for an exemplary embodiment of the present invention. A brake disc of the present invention includes a main body 1, a plurality of connection mechanisms 2 and a plurality of blocking assemblies 3.

The main body 1 defines an axial direction 51, a radial direction 52 and a circumferential direction 53. The main body 1 includes an inner disc 11 and an outer disc 12, and the outer disc 12 is disposed around the inner disc 11. The plurality of connection mechanisms 2 are arranged on the main body 1 in intervals in the circumferential direction 53, and each of the plurality of connection mechanisms 2 includes a projection 21 and an assembling portion 24 which are assemblable with each other. One of the projection 21 and the assembling portion 24 is disposed on the inner disc 11, and the other of the projection 21 and the assembling portion 24 is disposed on the outer disc 12. The assembling portion 24 includes an assembling hole 25 and a polygonal counterbore 26, the projection 21 and the assembling hole 25 extend in the radial direction 52, the projection 21 is inserted in the assembling hole 25, and the polygonal counterbore 26 is recessed in the axial direction 51 and in communication with the assembling hole 25.

In this embodiment, the inner disc 11 and the outer disc 12 are plate members and have a same largest dimension in the axial direction 51, and in the axial direction 51, a ratio of a depth of the polygonal counterbore 26 to a largest dimension of the main body 1 ranges from 0.2 to 0.4, which is conducive to lightweight and structural strength. The projection 21 is disposed on the outer disc 12, the assembling portion 24 is disposed on the inner disc 11, the assembling hole 25 includes a straight section 251 and a circular hole 252, the straight section 251 is in communication with the circular hole 252 and open on a circumferential surface of the inner disc 11, the projection 21 is shaped to match with a shape of the assembling hole 25, the projection 21 is engaged in the assembling hole 25 in the axial direction 51, so that the projection 21 is not disengaged from the assembling hole 25 in the radial direction 52. Preferably, the projection 21 has a thickness smaller than a thickness of the inner disc 11, which reduces the overall weight, and can make the projection 21 lower than the outer disc 12 and the inner disc 11 in the axial direction 51 to avoid unexpected impacts.

The plurality of blocking assemblies 3 are arranged on the main body 1 in intervals in the circumferential direction 53, each of the plurality of blocking assemblies 3 includes a first blocking unit 31 and a second blocking unit 32, the first blocking unit 31 and the second blocking unit 32 are positioned to opposing sides of the main body 1, and the first blocking unit 31 and the second blocking unit 32 block the projection 21 in the axial direction 51 so that the projection 21 cannot disengaged from the assembling portion 24 in the axial direction 51. The first blocking unit 31 is partially received in the polygonal counterbore 26, reducing the dimension of the main body 1 in the axial direction 51. The polygonal counterbore 26 is conducive to reducing weight.

Specifically, the projection 21 further includes a first side face 22 and a second side face 23, and the second side face 23 extends transversely from the first side face 22. When the projection 21 is inserted in the assembling hole 25, the first side face 22 is flash with a bottom surface 261 of the polygonal counterbore 26 so that the first side face 23 and the bottom surface 261 of the polygonal counterbore 26 are both abutted against the first blocking unit 31. The second side face 23 and the first blocking unit 31 are arranged in interval in the radial direction 52, wherein the first side face 22, the second side face 23 and the first blocking unit 31 define a gap 4. During assembling, the user's hand can reach into the gap 4 to hold the first blocking unit 31 in the axial direction 51 and the radial direction 52, which can effectively improve the stability of holding. Additionally, the gap 4 can increase the contact area between the main body 1 and the air, and the airflow can smoothly flow into and out of the gap 4 to take away heat, so that the heat of the brake disc can be effectively dissipated.

A portion of the first blocking unit 31 received in the polygonal counterbore 26 is non-circular and blocked by a hole wall of the polygonal counterbore 26 in a rotation direction of the brake disc, so that the first blocking unit 31 is non-rotatable relative to the polygonal counterbore 26 and it can effectively improve the stability of assembly connection. Specifically, the first blocking unit 31 includes a polygonal head 311 and a body portion 312, the body portion 312 extends laterally from the polygonal head 311, the body portion 312 is disposed through the projection 21 in the axial direction 51, the polygonal head 311 is received in the polygonal counterbore 26, the second blocking unit 32 includes a threaded member 33, a cover 34 and an elastic member 35, the threaded member 33 includes an enlarged head 331 and a connection portion 332 connected to each other, the connection portion 332 is disposed through the projection 21 and screwed to the body portion 312, the cover 34 is disposed around the connection portion 332 and interposed between the enlarged head 331 and the main body 1, the elastic member 35 is disposed around the connection portion 332 and located between the cover 34 and the main body 1.

In operation, by rotating the threaded member 33, the distance between the enlarged head 331 and the polygonal head 311 in the axial direction 51 can be adjusted, thereby providing space for the projection 21 to move relative to the inner disc 11 in the axial direction 51, so that the outer disc 12 can displace in the axial direction 51 during braking, so as to reliably make the parts contact each other and produce a better braking effect.

Preferably, the elastic member 35 is entirely covered by the cover 34, thus effectively providing an operating space for the elastic member 35 without interference from foreign objects, so that the elastic member 35 can effectively provide elastic force to the projection 21, and so that the outer disc 12 can be repositioned.

Preferably, the polygonal head 311 is shaped to match with a shape of the polygonal counterbore 26 so that there is a large contact area of the polygonal head 311 and the hole wall of the polygonal counterbore 26 in the rotation direction of the brake disc, and so that it provides a good anti-rotation effect. In this embodiment, the polygonal counterbore 26 is hexagonal.

Preferably, the polygonal head 311 is not protrusive beyond the polygonal counterbore 26, which provides a flat surface of the inner disc 11 and reduces unexpected interference.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A brake disc including:
a main body defining an axial direction, a radial direction and a circumferential direction, the main body including an inner disc and an outer disc, the outer disc being disposed around the inner disc;
a plurality of connection mechanisms arranged on the main body in intervals in the circumferential direction, each of the plurality of connection mechanisms including a projection and an assembling portion which are assemblable with each other, one of the projection and the assembling portion being disposed on the inner disc, the other of the projection and the assembling portion being disposed on the outer disc, the assembling portion including an assembling hole and a polygonal counterbore, the projection and the assembling hole extending in the radial direction, the projection being inserted in the assembling hole, the polygonal counterbore being recessed in the axial direction and in communication with the assembling hole; and
a plurality of blocking assemblies arranged on the main body in intervals in the circumferential direction, each of the plurality of blocking assemblies including a first blocking unit and a second blocking unit, the first blocking unit and the second blocking unit being positioned to opposing sides of the main body, and the first blocking unit and the second blocking unit blocking the projection in the axial direction so that the projection cannot disengaged from the assembling portion in the axial direction, the first blocking unit being partially received in the polygonal counterbore.

2. The brake disc of claim 1, wherein the projection is disposed on the outer disc, the assembling portion is disposed on the inner disc, the assembling hole includes a straight section and a circular hole, the straight section is in communication with the circular hole and open on a circumferential surface of the inner disc, the projection is shaped to match with a shape of the assembling hole, and the projection is engaged in the assembling hole in the axial direction.

3. The brake disc of claim 2, wherein the circular hole and the polygonal counterbore are arranged concentrically.

4. The brake disc of claim 1, wherein a portion of the first blocking unit received in the polygonal counterbore is non-circular and blocked by a hole wall of the polygonal counterbore in a rotation direction of the brake disc, and the first blocking unit is non-rotatable relative to the polygonal counterbore.

5. The brake disc of claim 1, wherein the first blocking unit includes a polygonal head and a body portion, the body portion extends laterally from the polygonal head, the body portion is disposed through the unit in the axial direction, the polygonal head is received in the polygonal counterbore, the second blocking unit includes a threaded member, a cover and an elastic member, the threaded member includes an enlarged head and a connection portion connected to each other, the connection portion is disposed through the projection and screwed to the body portion, the cover is disposed around the connection portion and interposed between the enlarged head and the main body, and the elastic member is disposed around the connection portion and located between the cover and the main body.

6. The brake disc of claim 5, wherein the polygonal head is shaped to match with a shape of the polygonal counterbore.

7. The brake disc of claim 6, wherein the projection is disposed on the outer disc, the assembling portion is disposed on the inner disc, the assembling hole includes a straight section and a circular hole, the straight section is in communication with the circular hole and open on a circumferential surface of the inner disc, the projection is shaped to match with a shape of the assembling hole, and the projection is engaged in the assembling hole in the axial direction; the circular hole and the polygonal counterbore are arranged concentrically; a portion of the first blocking unit received in the polygonal counterbore is non-circular and blocked by a hole wall of the polygonal counterbore in a rotation direction of the brake disc, and the first blocking unit is non-rotatable relative to the polygonal counterbore; the polygonal head is not protrusive beyond the polygonal counterbore; the projection further includes a first side face and a second side face, the second side face extends transversely from the first side face, when the projection is inserted in the assembling hole, the first side face is flash with a bottom surface of the polygonal counterbore so that the first side face and the bottom surface of the polygonal counterbore are both abutted against the first blocking unit, and the second side face and the first blocking unit are arranged in interval in the radial direction so that the first side face, the second side face and the first blocking unit define a gap; the inner disc and the outer disc are plate members and have a same largest dimension in the axial direction, and in the axial direction a ratio of a depth of the polygonal counterbore to a largest dimension of the main body ranges from 0.2 to 0.4; the polygonal counterbore is hexagonal; the elastic member is entirely covered by the cover; the projection has a thickness smaller than a thickness of the inner disc.

8. The brake disc of claim 5, wherein the polygonal head is not protrusive beyond the polygonal counterbore.

9. The brake disc of claim 1, wherein the projection further includes a first side face and a second side face, the second side face extends transversely from the first side face, when the projection is inserted in the assembling hole, the first side face is flash with a bottom surface of the polygonal counterbore so that the first side face and the bottom surface of the polygonal counterbore are both abutted against the first blocking unit, and the second side face and the first blocking unit are arranged in interval in the radial direction so that the first side face, the second side face and the first blocking unit define a gap.

10. The brake disc of claim 1, wherein the inner disc and the outer disc are plate members and have a same largest dimension in the axial direction, and in the axial direction a ratio of a depth of the polygonal counterbore to a largest dimension of the main body ranges from 0.2 to 0.4.

* * * * *